United States Patent [19]

Parkison

[11] 4,243,063
[45] Jan. 6, 1981

[54] MIXING VALVE

[75] Inventor: Richard G. Parkison, Louisville, Ky.

[73] Assignee: American Standard Inc., New York, N.Y.

[21] Appl. No.: 75,619

[22] Filed: Sep. 14, 1979

[51] Int. Cl.³ ............................................. F16K 19/00
[52] U.S. Cl. ................................ 137/100; 137/625.12; 137/625.41
[58] Field of Search .................... 137/98, 100, 625.12, 137/625.14, 625.15, 625.41

[56] References Cited

U.S. PATENT DOCUMENTS

| 2,631,003 | 3/1953 | Heinz, Sr. | 137/625.14 |
| 2,884,007 | 4/1959 | Green | 137/625.14 |
| 3,469,595 | 9/1969 | Petursson | 137/100 |
| 3,533,436 | 10/1970 | Parkison | 137/359 |
| 3,724,480 | 4/1973 | Povalski et al. | 137/98 |
| 3,921,659 | 11/1975 | Rudewick | 137/625.41 |
| 4,022,242 | 5/1977 | Turecek | 137/625.41 |
| 4,033,370 | 7/1977 | Egli | 137/100 |
| 4,095,610 | 6/1978 | Priesmeyer | 137/100 |

FOREIGN PATENT DOCUMENTS 2401648  1/1973  Fed. Rep. of Germany ........... 137/100

Primary Examiner—William R. Cline
Assistant Examiner—H. Jay Spiegel
Attorney, Agent, or Firm—Robert G. Crooks; James J. Salerno; John P. Sinnott

[57] ABSTRACT

An illustrative embodiment of the invention provides a valve seat that has hot, cold and discharge water apertures. A plate, relatively rotatable with respect to the valve seat, is pressed against the valve seat surface. A cavity formed in the plate adjacent to the surface in contact has a pair of axisymmetric lobes which are asymmetric with respect to an axis that is perpendicular to the axis of symmetry. This configuration permits cold water flow first through the valve with counterclockwise motion of the plate in spite of the relative sources of hot- and cold-water through simple inversion of the plate, as appropriate. Hot- and cold-water pressure loss and surge protection, moreover, is provided through a pressure balancing valve.

9 Claims, 10 Drawing Figures

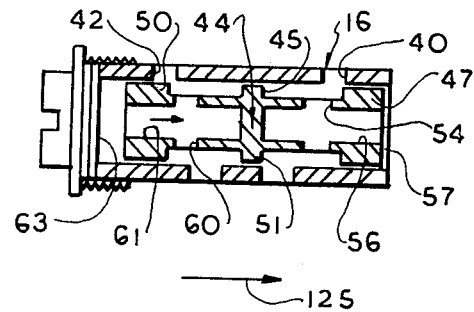
FIG. 3
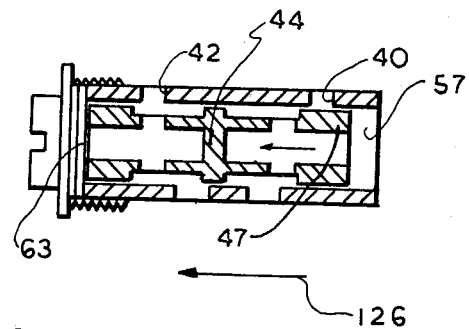
FIG. 4
FIG. 5
FIG. 6
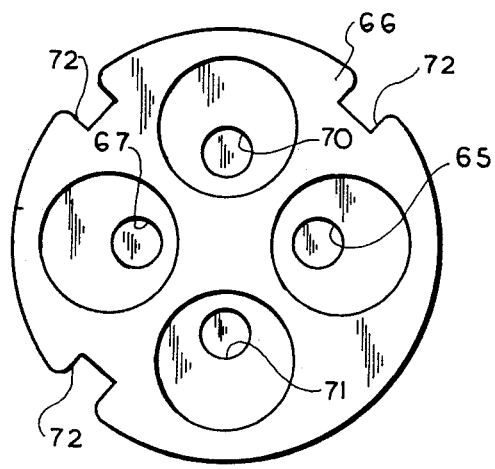
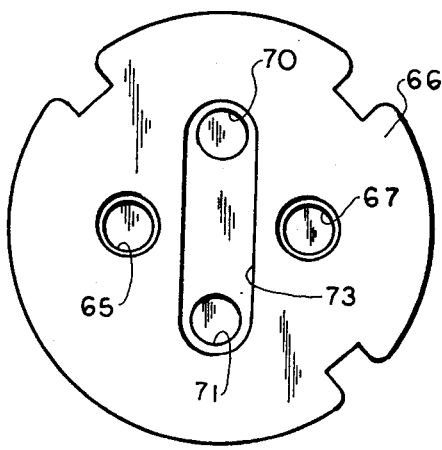

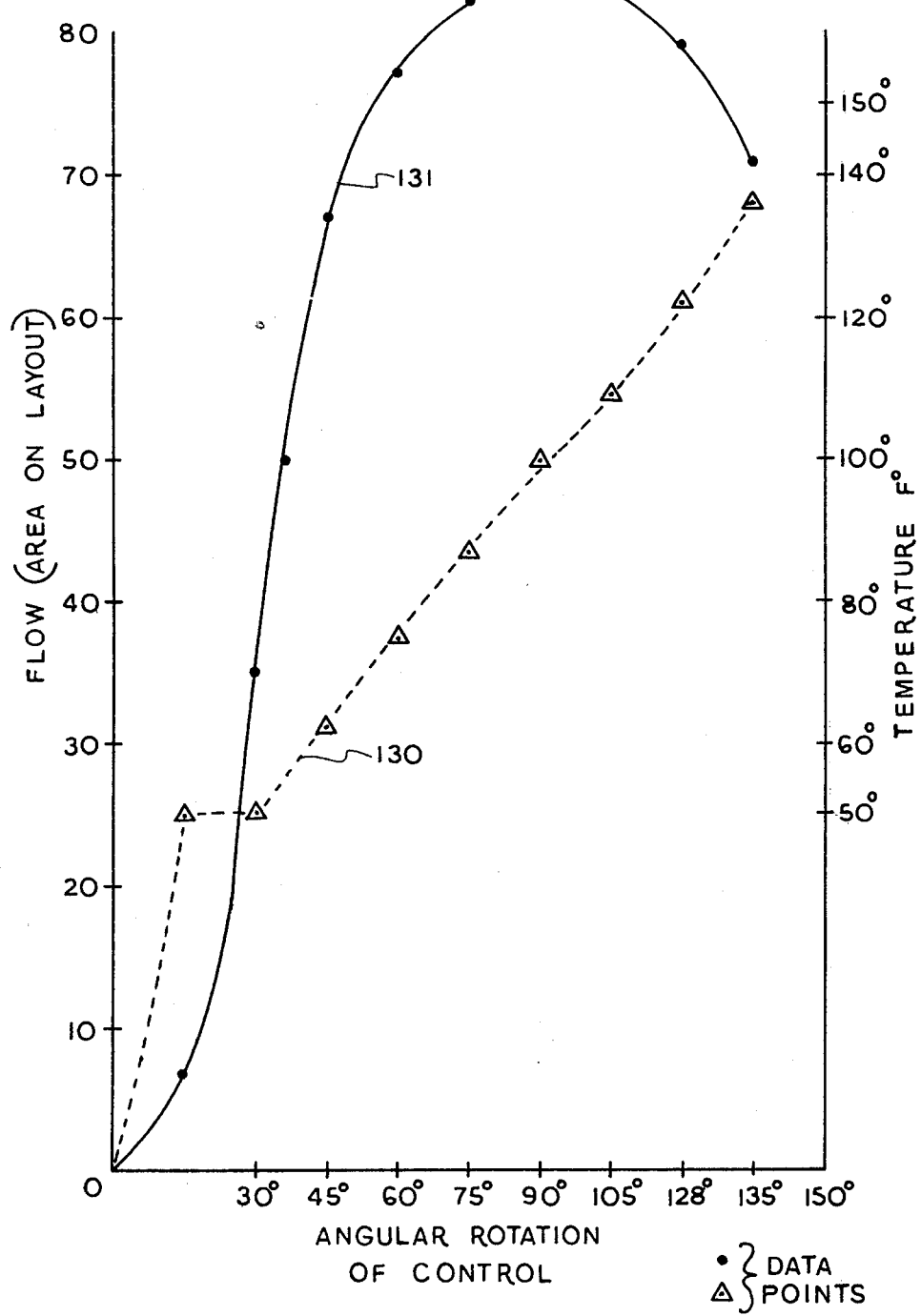

MIXING VALVE

This invention relates to valves and, more particularly, to plumbing fixture mixing valves that balance hot and cold water pressures, and the like.

There is a need for a sturdy, relatively inexpensive valve for mixing hot and cold water to produce a discharge stream that has a desired temperature which is intermediate of the two extremes. Preferably, a valve of this nature for use in connection with a conventional shower stall or shower and bathtub combination should have only one handle to produce the desired mixture. Valves of this nature are frequently used in multiple-dwelling structures, of which high-rise apartment blocks, motels and the like are typical. Naturally, the shower facilities in buildings of this character are vulnerable to cold or hot water pressure fluctuations in the plumbing supply lines during morning and peak load hours. In these circumstances, there is a need not only for a reliable and inexpensive device that will provide this desired cold and hot water mixing feature, but one that will afford protection against major changes in mixing valve water discharge temperatures that are caused by decreases in either the hot or the cold water pressures.

There are, of course, a number of other needs that a valve of this type should satisfy. Typically, the valve should have a long service life, be leak and corrosion free and provide a precise linear, or directly proportional relationship between valve handle position and output water temperature. All of these needs must be satisfied by means of a device that can be sold at a competitive price and installed in a simple, error-free manner.

Preferably, a truly acceptable mixing valve will maintain a water shower temperature within ±3° F. and quickly reduce the stream of hot water to only a trickle in the event of a cold water failure. There should not be any leakage between the hot and cold water supplies within the device, nor should additional check and stop valves be required. Adjustment sensitivity is another important feature of the invention. As mentioned above, the mixing valve should enjoy a linear relationship between knob rotation and water mixture temperature within the usual showering temperature range.

It is the customary practice in multiple-dwelling buildings, office blocks, and the like to place plumbing fixtures back-to-back on opposite sides of a partition. Frequently, in these circumstances, the fixtures are connected to common hot and cold water lines. This creates a fixture standardization and installation problem. For instance, from a safety point of view it is preferable for the cold water to flow first upon opening the mixing valve by turning the valve handle in a counter-clockwise direction. The reverse orientation of the hot-and-cold water mixing valve inlets for two of these valves relative to the common conduits to which they must be connected in this back-to-back arrangement creates an obvious difficulty with respect to the need to permit cold water flow upon valve opening for both of these valves. Ordinarily, expensive and time-consuming plumbing procedures are required to connect the valves in a manner that will preserve the counterclockwise movement of the valve handle to produce a cold water flow first condition. Further in this respect, there also should be some relatively simple means within the valve structure for stopping water flow to the flow mixing portion in order to permit this latter portion to be repaired.

Accordingly, there is a need to provide a mixing valve with all of these features at a competitive price.

These goals are achieved, to a large extent, through the practice of the invention.

Illustratively, a pressure balancing valve is provided that automatically equalizes the hot and cold water pressures in the mixing valve. A mixing valve cartridge, moreover, has a releasable stop that permits the mixing valve stem to be turned through 180° during installation in order to reverse the orientation of the hot- and cold-water mixing passageways within the cartridge relative to the hot and cold water conduits to which the entire valve assembly is attached.

Within the mixing valve cartridge a ceramic valve or stationary seat abuts a rotating disk to regulate the relative proportions of hot- and cold-water that are being mixed with a high degree of accuracy. This mixture control sensitivity is attained by means of a unique combination of inlet and discharge passageways that are established by selectively varying the relationship between the apertures and a recess within the stationary seat and a proportioned cavity in the rotating disk in order to establish a range of hot- and cold-discharge water mixtures that span a range from full cold to full hot.

The initial angular movement of the rotatable plate first establishes cold water fluid communication between one of the inlet apertures in the stationary seat and the discharge passageway to the shower nozzle or the bath spout through the proportioning cavity in the rotating disk. As the angle of rotation increases, the hot water in the other inlet aperture to the stationary seat communicates with the already flowing cold water from the first passageway, thereby enabling the hot water to combine with the cold water in any suitable degree to produce a desired discharge water mixture temperature.

To accommodate the reverse orientation of the hot- and cold-water inlet apertures in the stationary seat relative to the hot- and cold-water conduits, when these mixing valves are installed in a back-to-back configuration, it is only necessary to shift the position of the rotatable disk 180° relative to the stationary seat with which it abuts in order to permit cold water to flow first through the mixing valve.

Further in this regard, the combination of inlet apertures, recesses, cavities, and passageways are so structured that the relation between angular displacement of the rotatable valve plate with respect to its abutting plate and the change in water mixture temperature is essentially linear through the 90° F. to 100° F. range.

Internal leakage also is precluded through the use of not only two inlet passageway cartridge seals, but also two discharge passageway cartridge seals. The four seals together provide a balanced resultant force that assist in holding the valve plates together in sealing contact.

A pair of check stop valves also are installed in the hot and cold water, respectively, to permit flow from these mains to be interrupted and permit the mixing valve cartridge to be repaired or replaced, as necessary. These and other features and advantages of the invention are expressed in more complete detail in the following description of a specific embodiment of the invention, when taken in conjunction with the figures of the drawing. The scope of the invention, however, is limited only by means of the claims.

BRIEF DESCRIPTION OF THE DRAWINGS

FIG. 3 is a schematic diagram of the pressure balancing valve in FIG. 2 in a different operating status;

FIG. 4 is a schematic diagram of the pressure balancing valve in FIG. 2 in still another operating status;

FIG. 5 is a rear elevation of a valve plate for use in the embodiment of the invention shown in FIG. 1;

FIG. 6 is a front elevation of the valve plate that is shown in FIG. 5;

FIG. 10 is a graph of test data acquired in connection with the invention.

DESCRIPTION OF THE PREFERRED EMBODIMENTS

Figure 1:
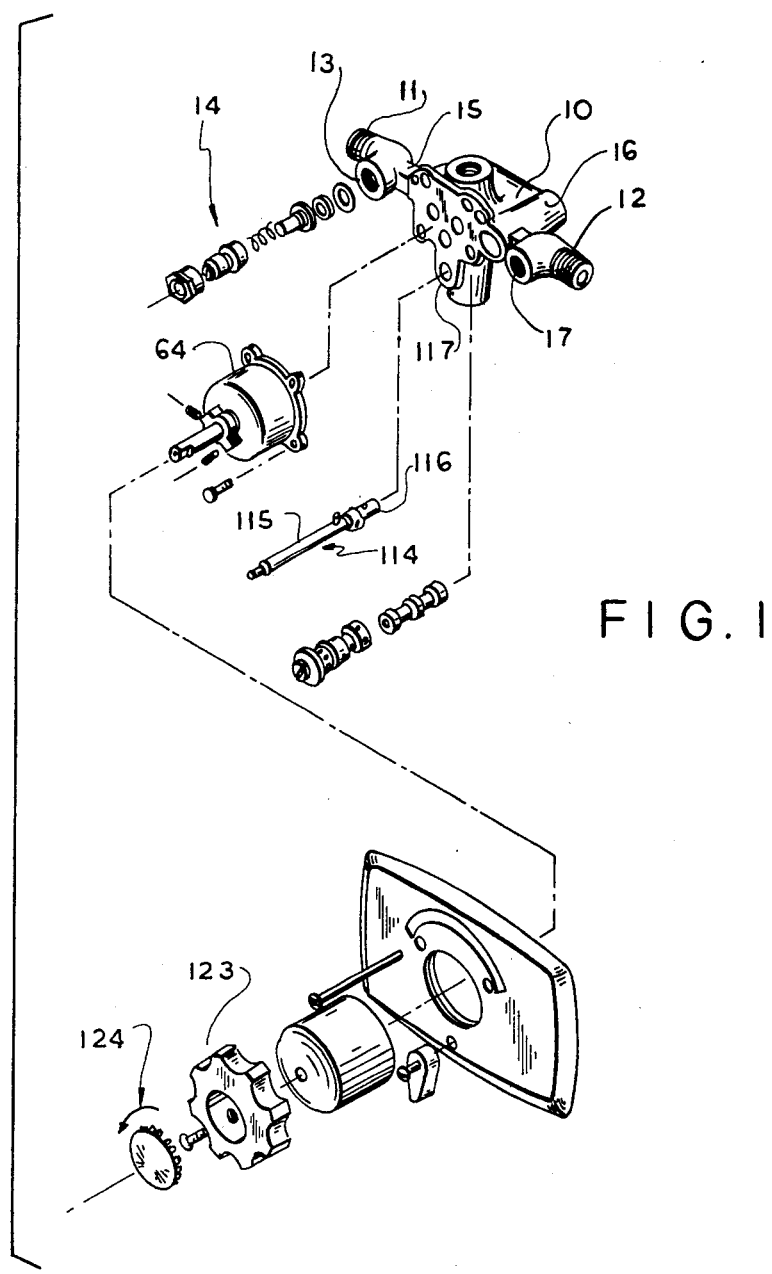
FIG. 1 is an exploded perspective assembly view of a typical embodiment of the invention.

For a more thorough understanding of the invention, attention is invited to FIG. 1 which shows a manifold 10 formed of brass or of some other suitable corrosion resistant material. The manifold 10 has a threaded hot water inlet fitting 11 and a threaded cold water inlet fitting 12. The hot water inlet fitting 11 is in fluid communication with a valve housing 13 for a hot water check stop 14, which will be described subsequently in detail. The passageway for the hot water in conduit 15 is routed through two right angle turns to the inlet (not shown in FIG. 1) of a pressure balancing valve housing 16.

The cold water inlet fitting 12 also establishes fluid communication with another inlet (not shown in FIG. 1) in the pressure balancing valve housing 16 by way of a cold water check stop valve 17.

Figure 2:
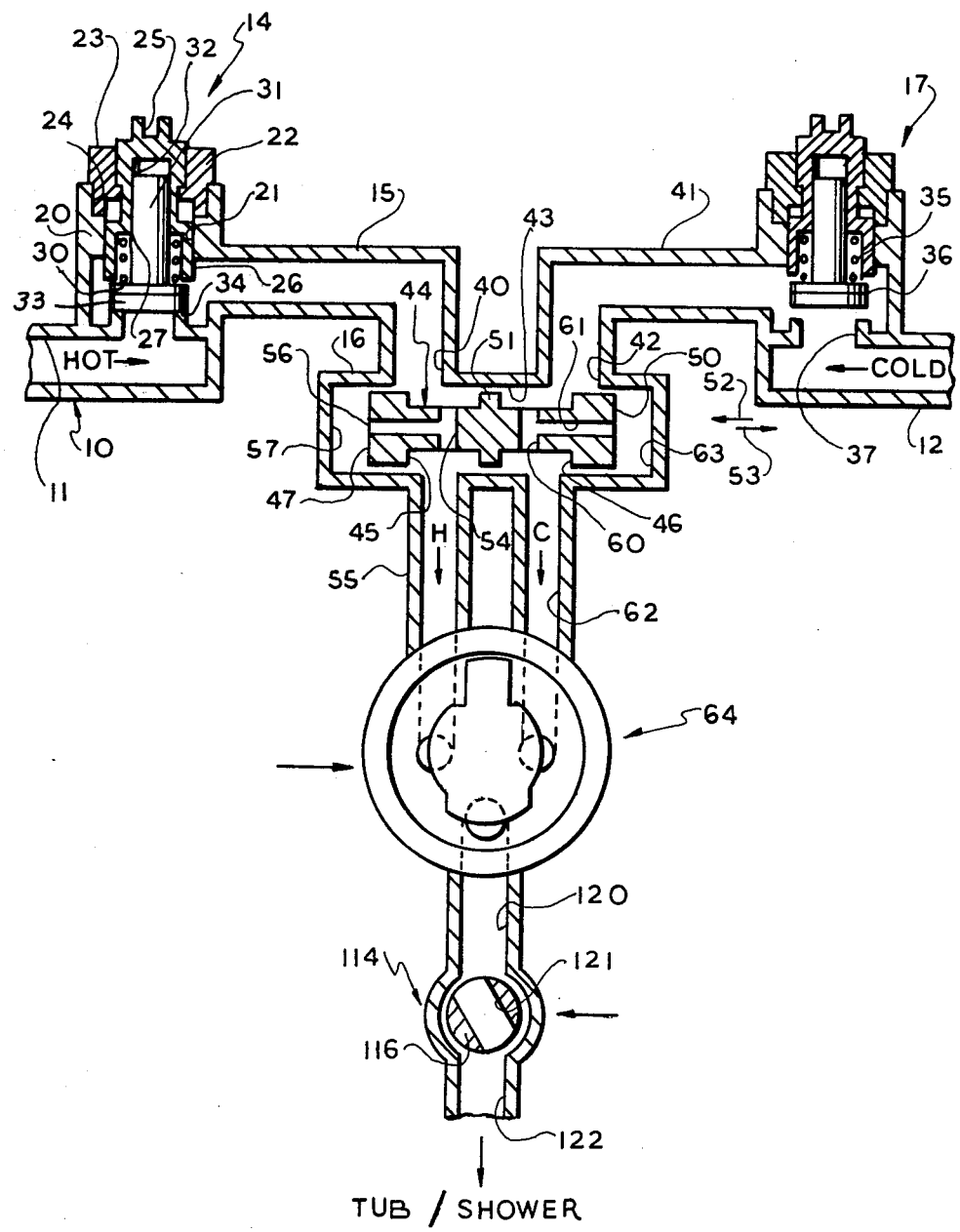
FIG. 2 is a schematic diagram of the mixing valve shown in FIG. 1.

Turning now to FIG. 2, hot- and cold-water check stop valves 14 and 17, respectively, are shown in full section in the manifold 10. The structure of each of these two valves 14 and 17 is essentially the same. Thus, with respect to the hot water check stop valve 14, a valve housing 20 has a bore 21 that accommodates a spring keeper 22. The spring keeper 22 is threaded or otherwise secured within valve bonnet 23 that is located in an enlarged recess 24 in the bore 21. A slot 25 is formed in the external end of the spring keeper to enable a screw-driver or other adjustment tool (not shown in the drawing) to thread the spring keeper 22 into or out of the bore 21, as appropriate, with respect to the manifold 10 and the bonnet 23.

Within the valve housing 20 a flange 26 on the spring keeper 22 is in sliding engagement with the corresponding surface of the bore 21. An annular shoulder 27 that is formed within the spring keeper 22 provides a bearing surface for a coil spring 30. The longitudinal axis of the coil spring 30, moreover, coincides with the longitudinal axis of a generally cylindrical spring guide and valve stem 31. As shown in the drawing, the valve stem 31 is in sliding engagement with a central bore 32 that is formed within the spring keeper 22 in order to permit a disk-shaped valve member 33 to engage and disengage, as appropriate, an annular valve seat 34 that is formed in the hot water inlet fitting 11 of the manifold 10.

As mentioned above, cold water flow through the inlet fitting 12 is selectively interrupted by means of the check stop valve 17 which opens and closes in response to the action of the flow or lack of flow of cold water which activates coil spring 35 and valve member 36 with respect to valve seat 37.

It will be recalled that the invention overcomes surges of hot and cold water through a pressure balancing valve. Thus, hot water in the conduit 15 flows into the pressure balancing valve housing 16 by way of a hot water inlet 40. In a similar manner, cold water in conduit 41 flows into the pressure balancing valve housing 16 through an inlet 42. Within the balancing valve housing there is a generally cylindrical chamber 43 that houses a pressure balancing spool 44. The length of the spool 44 is less than the corresponding length of the chamber 43. The spool 44, moreover, has two annular grooves 45, 46 which form annular lands 47, 50 at the extreme ends of the spool. A centrally disposed annular land 51, moreover, separates the two grooves 45, 46. Although, for illustrative purposes, the schematic presentation of the spool 44 and the chamber 43 in FIG. 2 shows a gap between the outside diameters of the lands 47, 50, and 51 and the inside diameter of the chamber 43, the fit between these lands and the inner surface of the chamber nevertheless is snug, but with sufficient clearance to permit the spool 44 to move laterally, in the directions of arrows 52, 53. Further in this respect, the groove 45 is slightly offset toward the central land 51 with respect to the hot water inlet 40 of the housing 16, when the spool is centered within the chamber 43. In a similar manner, the groove 46 also is offset toward the land 51 relative to the cold water inlet 42 when the spool 44 is centered in the housing 16. Note should be made, in this regard, of the fact that the grooves 45, 46 are appreciably wider than the respective hot- and cold-water inlets 40, 42.

The bore 54 in spool 44 intersects a longitudinally disposed bore 56 which provides a conduit for water flow between the bore 54 and a cavity 57 that is formed between the land 47 and the adjacent transverse end of the housing 16.

A similar combination of diametrically oriented bore 60 and intercepting conduit 61 provides fluid communication between the cold water outlet 62 and a cavity 63 that is formed by means of the land 50 and the adjacent end of the housing 16.

As shown in FIG. 2, the hot- and cold-water in the discharges 55 and 62, respectively flow to a mixing valve cartridge 64. Within the cartridge 64, as best shown in FIG. 5, the hot water passes through an individual aperture 65 that is countersunk in a disk-like ceramic valve or stationary seat 66. As illustrated, the center of the countersink recess is not coincident with the center of the aperture 65, the aperture being off-set toward the center of the seat 66 relative to the countersink. Similarly, cold water flows through a countersunk aperture 67 in the stationary seat 66.

Shower and faucet discharge apertures 70, 71 also are countersunk and each offset toward the center of the seat 66 relative to the respective countersink centers.

To provide the correct seat orientation within the mixing valve cartridge 64 (FIG. 2), moreover, three alignment grooves 72 (FIG. 5) are formed in the periphery of the seat 66, the three grooves being arranged asymmetrically in order to insure that the seat 66 is properly oriented within the cartridge.

In FIG. 6 the side of the seat 66 that is opposite to the side described above in connection with the countersunk apertures 65, 67, 70 and 71 is shown. On the side of the seat 66, the hot- and cold-water apertures 65, 67 are generally flush with the flat surface of the disk, save for a small chamfer. The shower and faucet apertures 70, 71, however, terminate on this side of the seat 66 at respective ends of an oblong cavity 73. This cavity 73 has a depth within the seat 66 that is about equal to half the thickness of the disk.

Figure 7:
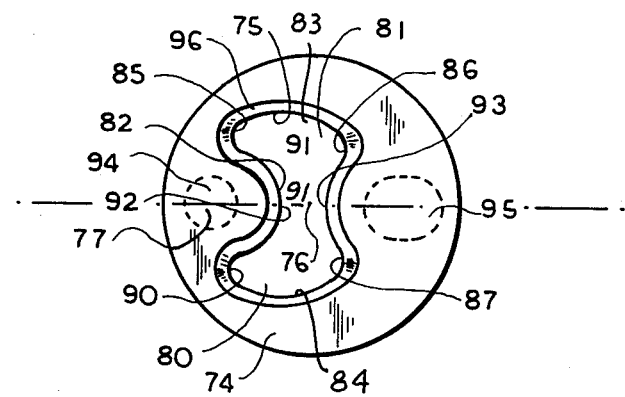
FIG. 7 is a rear elevation of a rotatable valve plate.

A rotatable disk-shaped plate 74 is shown in FIG. 7. A carefully proportioned cavity 75 is formed in the plate surface to a depth of about half the thickness of the plate 74. As shown, the transverse shape of the cavity 75 is developed through a combination of construction radii. Illustratively, for a plate 74 that has a diameter of about 1.05", the cavity 75 is offset slightly to the left as viewed in the drawing, from the center 76 of the plate 74 by approximately 0.105". Further in this regard, the cavity 75 is axisymmetric relative to diameter 77 of the disk, to provide two lobes 80, 81 which are each disposed on an opposite side of the diameter 77. These lobes are asymmetric with respect to that diameter which is perpendicular to the diameter 77. This relationship produces a pair of lobes in which the rounds 85 and 90 (FIG. 7) generate broader, larger volume portions of the cavity 75 than the rounds 86 and 87. In this manner, the portions of the lobes 80, 81 formed by the rounds 90, 85 more closely approach the adjacent perimeter of the rotatable plate 74 than those portions of the lobes that are formed by means of the rounds 87, 86 approach their respective adjacent plate perimeters. A point of intersection 82 between the diameter 77 and the wall of the cavity 75 that is offset to the left of the disk center 76 establishes the center of two construction arcs 84 and 83, each of about 30°. These arcs, which have radii each of approximately 0.350" determine the shape of the lobes 81, 80 respectively. The ends of the arcs 83, 84 terminate in small rounds 85, 86, 87, and 90 that fair the arcs 83, 84 into a waist-like transition 91 between the lobes 81, 80. The transition 91 is formed by means of two construction arcs 92, 93 that are swung about centers 94, 95 respectively with individual radii of about 0.36" and 0.217".

In the illustrative embodiment of the invention under consideration, a rather wide and shallow chamfer 96 is included in the construction arc radii described above. The chamfer 96 slopes at an angle of about 45° with respect to a perpendicular to the surface of the plate 74 to a depth of about 0.04" below the surface of the plate 74. This chamfer inhibits cavitation and thus eliminates objectionable noise of the faucet. Further in this respect, it may be advisable to place a small stainless steel screen cage (not shown in the drawing) in the cavity 75.

Figure 8:
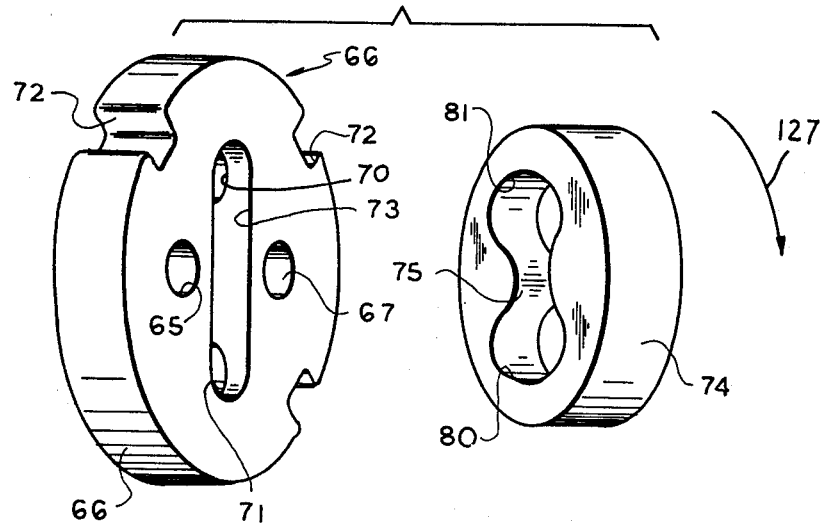
FIG. 8 is an exploded view of the two valve plates shown in FIGS. 6 and 7.

FIG. 8 illustrates the relative orientation of the valve or stationary seat 66 vis-a-vis the rotatable plate 74 in the closed position. Thus, the cavity 75 in the plate 74 is opposite and adjacent to the cavity 73 in the stationary seat 66. Lobe 80 in the cavity 75 is in general matching alignment with the discharge aperture 71 in the cavity 73. In a similar manner, the lobe 81 is in general alignment with discharge aperture 70.

Figure 9:
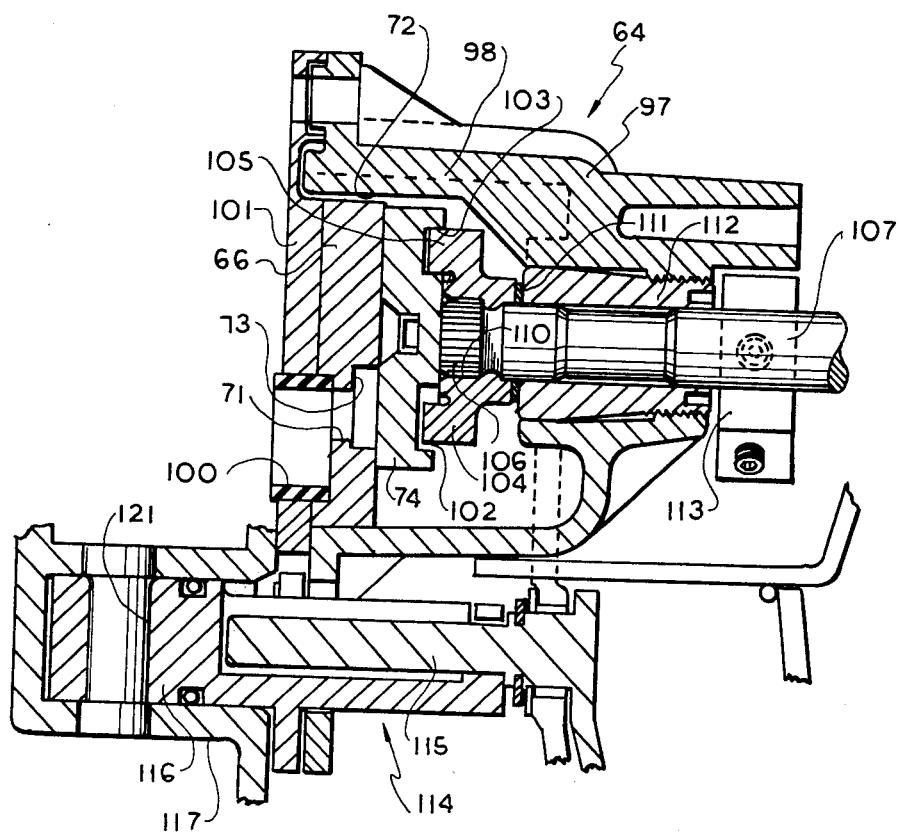
FIG. 9 is a side elevation in full section of a valve cartridge for use in connection with the invention.

The assembled mixing valve cartridge 64 is best viewed in FIG. 9. As shown, the valve or stationary seat 66 is supported within a valve cartridge housing 97.

The seat 66 is immobilized from rotational movement by means of alignment guides 98 (only one shown) in the interior of the housing 97, which guides register with the alignment grooves 72 that are formed in the seat 66. The seat 66 is lodged against a flat support plate 101 which permit hot- and cold-water to flow into the cartridge housing 64, and for mixed water to flow either to the bathtub spout or to the shower nozzle as described subsequently. The mixed water flows to the faucet by way of the discharge apertures 71, 70 (only the aperture 71 is shown in FIG. 9) from the cavity 73. This water, moreover, flows through two hollow cylindrical and resilient seals 100 (only one of which is shown in FIG. 9) that are mounted in the support plate 101, which plate is secured to the cartridge housing 97. The resilient seal 100, moreover, is one seal in a group of four, each of which is received in a respective countersink formed in the stationary seat 66 with respect to the apertures 65, 67, 70 and 71.

In accordance with a feature of the invention the four resilient seals (of which only the seal 100 is shown in FIG. 9) bear against the stationary seat 66 to produce an evenly distributed force that presses the stationary seat against the rotatable plate 74. The even distribution of the force pressing the seat 66 against the rotatable plate 74 improves the watertight integrity of the apertures, passageways and cavities, thereby precluding leakage within the valve cartridge 64. A calculation demonstrating the overall "Hold Together" force aspect of the invention is as follows:

Force ($F_T$) applies as a free body, where $F_T$ represents the force pushing the ceramic seat and plate against the control stem.

$$F_{T1} = p \times A_{seals}$$

where p = water pressure
$A_{seals}$ = seal area assume p = 100 lbs/in$^2$ and that the four seals are $\frac{1}{2}$" in diameter, then $$F_{T1} = [100 \times 4 (.5^2 \times \pi/4)]$$
$$F_{T1} = 78.54 \text{ pounds}$$

plus four seals pushing at six pounds each when compressed 0.030", therefore:

$$F_T = 78.54 + 24$$

$$F_T = 102.54 \text{ pounds}$$

Considering the valve seat as a free body, then $$F_T = F_{pA} + F_H$$

where $F_{pA}$ is the hydraulic force on all wetted surfaces on the valve seat on the side next to the rotatable plate pushing the ceramic pieces apart.

$$\begin{aligned} F_{pA} &= p \times A_{of\ wetted\ surfaces} \\ &= 100 \times (\frac{2.22}{16} \times 2) + [(\frac{1.0}{16} + \frac{1.29}{16}) - 2(.200^2 \times \frac{\pi}{4}] \\ &\quad - (\frac{.400}{16} \times 2) \\ &= 100 \text{ lbs/in}^2 \times 308 \text{ in}^2 \\ &= 30.8 \text{ pounds} \end{aligned}$$

and $$F_H = F_T - F_{pA},$$

where $F_H$ represents the total hold together force $F_H = 102.5 - 30.8 = 71.7$ lbs. hold together force, which is comprised of 24 lbs. of force of the seals squeezed 0.030" as well as a hydraulic resultant of $(78.5 - 30.8)$, or 47.7 lbs.

The area of ceramic contact is $$0.866 - [0.308 + (0.031)] + 0.063 = 0.590,$$

producing a ceramic-to-ceramic pressure of 71.7 lbs ÷ 0.590 = 122.0 psi which thus tends to press the stationary seat 66 to the rotatable plate 74 and prevent water leakage at this interface.

Turning once more to FIG. 9, it can be seen that the rotatable plate 74 is provided with a pair of diametrically oriented indentations 102, 103 which receive mating bosses 104, 105 in a serrated driving member 106. Motion of the driving member 106 and hence, of the rotatable plate 74, is controlled by means of a shaft or valve stem 107. The end of the valve stem 107 that is seated in the driving member 106 has a serrated end, moreover, in order to engage the surface of the bore 110 in which it is received, and making certain that the stem and the driving member turn together as a unit.

A washer 111 on the valve stem 107 is interposed between the driving member 106 and a threaded bushing 112 that is received in the interior of the valve cartridge housing 97.

In accordance with another aspect of the invention, a releasable stop 113 is secured to the valve stem 107 by means of a set screw, or the like. The stop 113 engages portions (not shown) of the valve cartridge housing 97 in order to limit the angular rotation of the valve stem 107 (and thus, the degree of rotation of the plate 74) relative to the seat 66. In this way, the degree of angular motion permitted to the rotatable plate 74 is limited to that which will produce a full range of discharge water temperatures from an initial first full cold flow through to full hot.

It will be recalled that the portions of the hot- and cold-water inlet fittings 11 and 12, respectively, (FIGS. 1 and 2) are relatively reversed with regard to the hot- and cold-water supply conduits (not shown in the drawing) in the building in those instances in which two mixing valves are to be mounted in the "back-to-back" configuration. Thus, in this reverse connection mode, the hot water inlet fitting 11 is adjacent to the cold water conduit (not shown), and the cold water inlet fitting is adjacent to the hot water inlet fitting (also not shown). In these circumstances, installing cross-connections for the manifold 10 to couple, for instance, the hot water inlet fitting 11 to the hot water conduit which now is located adjacent to the cold-water inlet 12 is an expensive and time consuming task.

Consequently, this problem is overcome through the practice of another feature of the invention. Illustratively, the releasable stop 113 (FIG. 9) on the valve stem 107 can be loosened to permit a free rotation of the valve stem relative to the stop. To enable the hot-water inlet fitting 11 (FIGS. 1 and 2) to be connected to a cold water conduit, and vice-versa, while nevertheless preserving the important first cold water flow through a counterclockwise motion of the valve stem 107 (FIG. 9), the valve stem and the rotatable plate 74 to which it is attached are shifted 180° relative to the rotatable plate orientation that is shown in FIGS. 8 and 9. The releasable stop 113 is then once more secured to the valve stem 107 to limit the angular rotation of the valve stem 107 to the water temperature range from full cold to full hot. This 180° reversal in the orientation of the rotatable plate 74 has the effect of enabling cold water to flow from the mixing valve first, in spite of the fact that the hot-water inlet fitting 11 (FIGS. 1 and 2) now is connected directly to a cold water conduit and the cold-water inlet fitting 12 is connected to a hot water conduit.

Turning once more to FIG. 1, a mixed water volume control 114 comprises a valve stem 115 and a valve portion 116 attached to that end of the stem which is journaled in a valve housing 117. As shown, the valve housing 117 is formed as an integral part of the manifold 10. The valve housing 117 (FIG. 9) is, moreover, positioned immediately below the mixing valve cartridge 64 and, as illustrated schematically in FIG. 2, is in fluid communication with the cartridge through a mixed water discharge conduit 120.

A bore 121 is diametrically disposed within the valve member 116. The bore 121 thus controls the volume of mixed water flow through the volume control 114 by permitting the valve member 116 to be turned relative to the valve housing 117, thereby obstructing or exposing all (or some desired portion of) the bore 121 to the flow of mixed water in the conduit 120. Restricted in the foregoing manner, the necessary volume of mixed water is discharged from the volume control 114 to a bathtub spout or a shower nozzle by way of a conduit 122.

In operation, a valve handle 123 (FIG. 1) on the mixing valve cartridge 64 is turned in a counterclockwise direction, as indicated by arrow 124. As described subsequently in more complete detail, this motion permits cold water to flow first through the mixing cartridge 64. Initiating cold water flow through the cartridge 64 effectively lowers the cold water pressure in the flow path that includes the cold water discharge 62 (FIG. 2), the bore 60 and the conduit 41. The low pressure in the conduit 41 relative to the higher cold water pressure in the inlet fitting 12 causes the valve member 36 in the cold water check stop valve 17 to unseat and thereby establish direct fluid communication through the mixing valve cartridge 64 to the mixed water discharge conduit 120.

The purpose of the spring loaded stop valve 14, 17 is two fold. The valves, for example, can be closed with a screw-driver inserted into the slot 25 for the valve 14 and the corresponding slot in the valve 17 to stop flow through the valves in the event the mixing valve cartridge needs repair. The spring loaded valves also act as check valves, allowing flow in only one direction. Therefore, flow can never move into the supply lines from the faucet. This cross flow from one supply line to the other could occur, if it were not for the check valves, when the mixing valve is closed and the pressure in the hot and cold lines leading into the faucet are not equal. The slow crossflow can occur under the above conditions between the spool (44) and the bore of the chamber (43).

Protection against hot- or cold-water surges or pressure losses is the function of the pressure balancing valve. As shown in FIG. 2, the pressure balancing spool 44 is centered within the pressure balancing valve housing 16 under normal conditions of essentially balanced hot- and cold-water inlet pressures.

Attention now, however, is invited to FIG. 3 which illustrates the status of the pressure balancing valve in a condition in which either a surge of cold water pressure or a decrease in the hot water pressure occurs in the main supply conduits (not shown). Assume, for instance, that the cold water pressure at the cold water inlet 42 remains essentially constant at a time during which the hot water pressure in the hot water inlet 40 undergoes a radical decrease. The hot water pressure in the bore 54, the bore 56 and the cavity 57 is relatively lower than the cold water pressure in the corresponding bores 60, 61 and cavity 63. The greater hydraulic pressure in the cold water cavity 63 vis-a-vis the lower pressure in the hot water cavity 57 compels the pressure balancing spool 44 to shift toward the low pressure cavity in the direction of arrow 125. This movement of the balancing spool 44 toward the low pressure hot water cavity 57 shifts the land 50 into a partially obstructing position with respect to the cold water inlet 42 for the valve housing 16. Meanwhile, the hot water inlet 40 is completely unobstructed because the land 47 is shifted away from the inlet 40 and the thin, centrally disposed land 51 with the associated wide groove 45 do not block the inlet 40. In this manner, the hot- and cold-water pressures are balanced in order to equalize the hot- and cold-water outlet pressures in the presence of a marked decrease in hot water pressure or an appreciable increase in the cold water pressure.

FIG. 4 shows the action of the pressure balancing valve in those instances in which there is a complete loss of cold water pressure. Thus, the hot water line pressure in the cavity 57 and the loss of pressure in the cold water cavity 63 compels the pressure balancing spool 44 to shift in the direction of arrow 126 toward cavity 63.

In this condition, the land 47 essentially blocks the hot water flow from the hot water inlet 40 through the balancing valve. The cold water inlet 42, in contrast, is completely unimpeded, but because of the loss of cold water pressure entering the cold water inlet 42, there is no cold water flow. Therefore, the water exiting either the bathtub spout or the shower nozzle would be hot water only, but the flow would be reduced to only a trickle because the pressure balancing spool 44 has essentially blocked the hot water inlet 40.

Turning again to FIG. 2, after passing through the pressure balancing valve the hot water in the discharge 55 and the cold water in the discharge 62 enter the mixing valve cartridge 64. Perhaps best shown in FIG. 5, the hot water flows through the aperture 65 in the stationary seat 66. The cold water, in turn, flows through the aperture 67. Depending on the relative orientation of the cavity 75 (FIG. 8) of the rotatable plate 74 with respect to the apertures 65, 67, no water, only cold water, only hot water or only some other desired proportionate mixture of cold and hot water will flow from the cavity 75 and the opposing cavity 73 in the seat 66 through the discharge aperture 70 and 71.

In this respect, it will be recalled that the lobes 80, 81 (FIG. 7) of the cavity 75 are asymmetric relative to the rounds 87 and 85, respectively. In these circumstances, if the rotatable plate 74 is turned in the direction of arrow 127, it can be seen in FIG. 8, that fluid communication through the stationary seat 66 first is established between the round 90 of the lobe 80 and the cold water aperture 67.

Where the water main supply lines coming to the mixing valve are reversed, thereby coupling hot water to the aperture 67 the need thus remains to enable this fitting to provide cold water flow first on turning the rotatable plate 74 in the direction of the arrow 127. In accordance with a salient characteristic of the invention, the rotatable plate 74 (FIGS. 8 and 9) should be rotated 180° relative to the releasable stop 113 (FIG. 9), and the valve seat. As a consequence of this inversion of the rotatable plate 74, fluid communication first is established between the round 90 of the lobe 80 and the new cold water aperture 65 in the seat 66, when turned in the direction of the arrow 127.

As the rotatable plate 74 continues to be turned in the direction of the arrow 127, the lobe 81 begins to establish fluid communication with the now hot water aperture 67 and as the rotatable plate is turned further the hot water mingles with the already flowing cold water in the cavities 73 and 75.

The physical proportions of the lobes 80, 81 provide an essentially linear relation between the rotation of the valve handle 123 (FIG. 1) and the change in water outlet temperature. Attention is invited in this regard to FIG. 10 which shows a curve 130 of test data supporting the linear relation between valve handle rotation and water mixture temperature. A curve 131 of total flow as a function of valve handle rotation also is shown in FIG. 10. This curve 131 demonstrates the almost constant flow rate that is established with this mixing valve through a broad range of mixture temperature operation.

The following table relates rotation angle of the mixing valve handle 123 (FIG. 1), the hot and cold flow areas exposed through the mutual relative angular orientation of the seat 66 (FIG. 8), and the rotatable plate 74, and the output water temperature:

| MIXING VALVE HANDLE ROTATION | FOLW COLD | FLOW HOT | FLOW TOTAL | MIX TEMP. ASSUMING 50° F., 150° F. |
|---|---|---|---|---|
| | (AREA ON LAYOUT) | | | |
| 15° | .07 | 0 | .07 | 50° |
| 30° | .35 | 0 | .35 | 50° |
| 45° | .59 | .08 | .67 | 62° |
| 60° | .58 | .19 | .77 | 75° |
| 75° | .52 | .30 | .82 | 87° |
| 90° | .42 | .42 | .84 | 100° |
| 105° | .34 | .49 | .83 | 109° |
| 120° | .22 | .57 | .79 | 122° |
| 135° | .10 | .61 | .71 | 136° |

Upon discharge from the mixing valve cartridge 64 (FIG. 2), the water flows through the mixed water discharge conduit 120 with a volume that is determined by means of the exposed flow area of the bore 121 in the mixed water volume control 114. After flowing through the bore 121, the water flows through the conduit 122 to a bathtub spout (not shown) or a shower nozzle (also not shown).

Thus there is provided in accordance with the invention, a relatively inexpensive mixing valve that is reliable, generally leak- and corrosion-free and swiftly adaptable to a back-to-back installation without losing the very desirable cold water flow first capability.

What is claimed is:

1. A mixing valve comprising a valve seat having a hot fluid aperture, a cold fluid aperture and a discharge aperture formed therein, a plate having a surface abutting said valve seat and rotatable relative thereto, said plate having a cavity formed in said abutting surface, said cavity having a pair of lobes each of said lobes being disposed on an opposite side of an axis and being axisymmetric therewith, said lobes being asymmetric with respect to an axis that is perpendicular to said axis of symmetry and having one portion of each of said lobes having a substantially larger volume than the other respective lobe portions, the each said larger volume lobe portion being offset in the same direction relative to the center of said plate toward said plate perimeter, said lobes each having rounds formed at the ends thereof to provide a smooth development to a waist-like transition that joins said lobes together at said ends to enable the portion of one of said lobes that is offset toward said plate perimeter to register with one of said cold fluid or hot fluid valve seat apertures before the other lobe registers with the other of said cold fluid or hot fluid in order to establish fluid communication therethrough.

2. A mixing valve according to claim 1 further comprising a chamfer for said plate cavity, said chamfer substantially eliminating cavitation therewithin.

3. A mixing valve according to claim 2 wherein said valve seat further comprises a cavity formed therein adjacent to said abutting plate surface and in registry with said plate throughout the relative rotation of said plate with respect to said valve seat, said valve seat cavity being in fluid communication with said discharge aperture.

4. A mixing valve according to claim 3 wherein said valve seat has alignment grooves formed therein.

5. A mixing valve according to claim 4 wherein said valve seat further comprises two discharge apertures formed therein, said apertures being in fluid communication with said valve seat cavity and at opposite ends thereof, said hot water aperture and said cold water aperture being spaced from said valve seat cavity equal distances and on opposite sides thereof, all of said apertures being countersunk on the side of said valve seat that is opposite to the side that abuts said plate, said apertures being offset relative to said respective countersinks toward the center of said valve seat, cylindrical flexible seals each pressed into a respective one of said countersinks in order to assist in providing a balanced resultant force to retain said valve seat and said plate in essentially water-tight abutting contact.

6. A mixing valve according to claim 1 further comprising a manifold, a cold water inlet fitting establishing fluid communication with said manifold, a hot water inlet fitting establishing fluid communication with said manifold, a pressure balancing valve coupled to said manifold for adjusting the volumes of cold- and hot-water flow through said manifold, a hot water discharge connecting said pressure balancing valve with said valve seat hot water aperture, and a cold water discharge for connecting said pressure balancing valve with said valve seat cold water aperture.

7. A mixing valve according to claim 6 wherein said pressure balancing valve further comprises a housing having a hot water inlet, a cold water inlet and a chamber in fluid communication with said hot- and cold-water pressure balancing valve inlets, a pressure balancing spool within said housing and slidable therewithin, said spool having two grooves formed in the surface thereof, said grooves being appreciably wider than a respective one of said housing inlets, a land separating said grooves, said land being substantially narrower than the separation between said housing inlet, a pair of further lands each disposed on a respective opposite end of said spool, and each said further lands being at least as wide as said respective housing inlet, said spool having two bores formed therein, each of said bores establishing fluid communication for the hot- and cold-water through said spool, and a pair of further bores formed in said spool, each to establish fluid communication between a respective one of said hot- and cold-water bores and said housing chamber.

8. A mixing valve according to claim 6 further comprising a hot water check stop valve for selectively interrupting hot water flow from the valve to said hot water inlet fitting, and a cold water check stop valve for selectively interrupting cold water flow from the valve to said cold water inlet fitting in order to prevent said cold- and hot-water from mixing.

9. A mixing valve according to claim 6 further comprising a mixed water volume control valve, a mixed water discharge conduit establishing fluid communication between said valve seat discharge aperture and said mixed water volume control valve in order to regulate the volume of mixed water flow from the mixing valve.

* * * * *